No. 708,361. Patented Sept. 2, 1902.
J. W. KELLEY & C. W. ADKINS.
STOCK WATERER.
(Application filed Oct. 31, 1901.)
(No Model.)
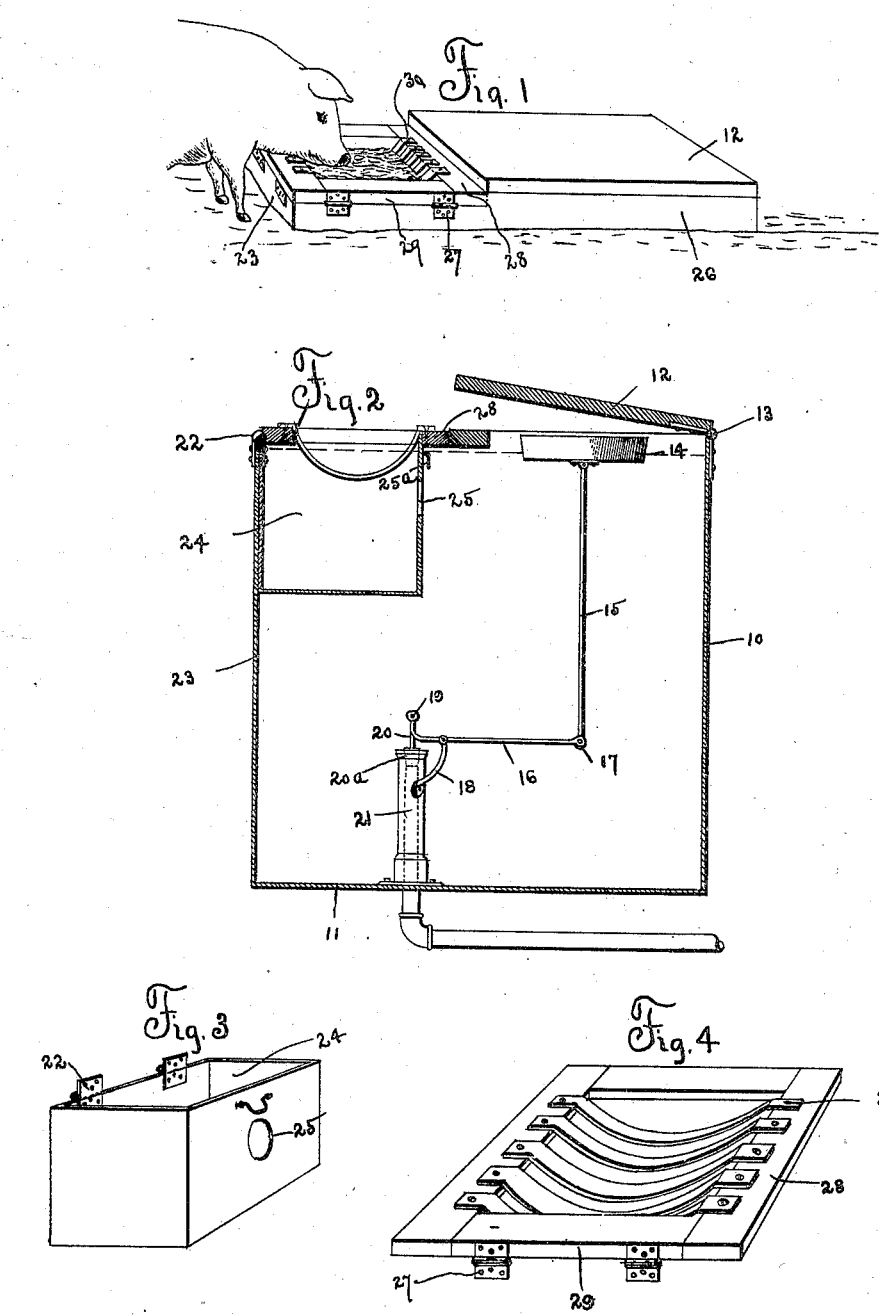
Witnesses:
Chas. E. Corbett
R. S. Orwig
Inventors: John W. Kelley & Cyrus W. Adkins.
By Orwig & Lane Attys.

UNITED STATES PATENT OFFICE.

JOHN W. KELLEY AND CYRUS W. ADKINS, OF HASTINGS, IOWA.

STOCK-WATERER.

SPECIFICATION forming part of Letters Patent No. 708,361, dated September 2, 1902.

Application filed October 31, 1901. Serial No. 80,614. (No model.)

*To all whom it may concern:*

Be it known that we, JOHN W. KELLEY and CYRUS W. ADKINS, citizens of the United States, residing at Hastings, in the county of Mills and State of Iowa, have invented certain new and useful Improvements in Stock-Waterers, of which the following is a specification.

The objects of our invention are to provide a watering-trough for animals of simple, durable, and inexpensive construction that when in use will allow the animal to drink freely from the trough and at the same time prevent the animal from getting into it.

A further object is to provide a device of this class which prevents the dirt and other foreign substances from getting into the tank proper and enables the trough into which the dirt falls to be easily cleaned.

A further object is to provide means for regulating the flow of water into the trough.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 shows the top portion of the tank device when in position for use. Fig. 2 is a vertical sectional view of the tank, showing the means for filling the tank and for shutting off the water when the tank is filled. This view also shows trough and means for protecting the same. Fig. 3 shows in perspective the trough as distinguished from the tank proper and means for attaching the trough to the tank. Fig. 4 is a perspective view of the grating, showing the means for attaching the grating to the tank.

Referring to the accompanying drawings, we have used the reference-numeral 10 to indicate the back end of the tank, the numeral 11 to indicate the bottom of the tank, and the numeral 12 to indicate the cover, which is attached to the back end portion by the hinge 13. This cover is to keep out foreign substances from that portion of the tank which is not protected by the trough and grating. This cover is also to protect the float 14, which is the top portion of a device designed to regulate the flow of water into the tank.

Attached to the under surface of the float 14 is the rod 15. At the lower extremity of the rod 15 and pivotally attached to it is the rod 16. When this rod is in position, it is substantially at right angles to the rod 15. The rod 16 is attached pivotally to a brace 18, which is attached at its lower end to the supply-pipe 21. The end portion of the rod 16 away from the rod 15 is bent substantially at right angles to its body portion, and the end 19 is attached pivotally to the rod 20, which has at its lower extremity a stopper $20^a$, that fits into the water-supply pipe 21.

In the upper part of the forward end of the tank and attached by the hinges 22 to the front end 23 thereof is a trough 24, whose downward movement is limited by the exterior side of the trough coming in contact with the inner surface of the end of the tank. This trough is made, preferably, of a thin sheet of metal and is designed to prevent dirt from getting into the tank proper and allows the water when at sufficient height to flow into the trough through the opening 25 therein. We have attached a handle $25^a$ to the inner side of the trough, which may be easily reached from above and used when the operator desires to swing the trough upwardly upon the hinges 22 when the trough needs cleaning. In this manner the trough can be easily cleaned of any foreign substances contained therein without getting the dirt from it into the tank proper.

Over the trough 24 and attached by the hinges 27 to the side of the tank 26 we have provided a protecting-grate, comprising the side pieces 28, the end pieces 29, and the metal cross-strips 30, which cross-strips are bent downwardly at their central portion to a point below the water-level in the trough, so that the animal may drink freely, and at the same time he will be prevented from getting into it when this cover is in position for use.

In practical use the tank is placed in the ground so that the top portions only are exposed above the surface. The water is permitted to come into the tank by the supply-pipe 21, and the weight of the float 14 and of the rods 15 and 16, connected with each other, and of the rod 16, pivotally connected with the brace 18 and the rod 20, keeps the stopper out of the opening in the end of the pipe 21, so that the water will run into the tank. When the water reaches a sufficient height and rising constantly, the float is forced upwardly and the stopper 28 is pushed gradually into the opening in the end of the pipe 21, because the float is connected in the pivotal manner above stated. In this manner the water is shut off when it reaches a desired level in the tank. As soon as the water reaches the opening 25 in the trough 24 it flows into this trough and maintains the same level as in the tank proper. Thus the water will rise above the bars 30 of the grating when properly regulated and permit the animal to drink the water over the grating.

Having thus described our invention, what we claim, and desire to secure by Letters Patent of the United States therefor, is—

1. In a stock-waterer, the combination of a water-tank, and open-topped trough hinged to the tank having one or more openings in its sides, and having a solid bottom mounted in the tank to project below the water-level thereof, and a grating hinged to the tank over the trough partially below the water-level thereof for the purposes stated.

2. In a stock-waterer, a combination of a water-tank provided with a supply-pipe, a stopper in said supply-pipe, means for automatically removing and inserting said stopper into the supply-pipe, a trough in the upper corner of the tank and hinged to it, one or more openings in its interior side, a grating protector for the trough partially below its water-level and hinged to the tank, and a cover for that portion of the tank not protected by the grating and trough for the purposes stated.

3. In a stock-waterer, a combination of a tank having a water-supply pipe, a float 14, a rod 15 connected therewith, a rod 16 pivotally connected with the rod 15, a rod 20 having a stopper on its lower end pivotally attached to the rod 16, a brace 18 attached to the pipe 21 and pivotally attached to the rod 16, which float, rods and stopper are to act in conjunction with each other in regulating the supply-water, a cover 12, attached to the tank and in the upper front portion of the tank, a trough, with one or more openings in the side thereof, to permit the flow of the water into it, hinged to the end of the tank 23, a handle on said trough, a grating hinged to the tank directly over the trough having the side pieces 28, the end pieces 29 and the metal cross-bars 30 partially extending into the trough and below the water-level in it for the purposes stated.

JOHN W. KELLEY.
CYRUS W. ADKINS.

Witnesses:
SAMUEL SCOTT,
EVERETT PURCELL.